United States Patent [19]

Ranoia

[11] Patent Number: 5,571,024
[45] Date of Patent: Nov. 5, 1996

[54] DISCONNECT FOR ELECTRIC METERS

[76] Inventor: Vincent J. Ranoia, 504 Westbourne Dr., Broomall, Pa. 19008

[21] Appl. No.: 339,814

[22] Filed: Nov. 15, 1994

[51] Int. Cl.$^6$ .................................................. H01R 13/44
[52] U.S. Cl. .......................................... 439/146; 174/138 F
[58] Field of Search .................................. 439/146, 149; 174/138 F

[56] References Cited

U.S. PATENT DOCUMENTS

| | | | |
|---|---|---|---|
| 2,643,362 | 6/1953 | Johansson | 439/146 |
| 3,519,976 | 7/1970 | Orr | 439/146 |
| 3,528,046 | 9/1970 | Sauer | 336/70 |
| 3,528,049 | 9/1970 | Orr | 439/146 |
| 4,430,524 | 2/1984 | Santucci | 174/138 F |

Primary Examiner—Neil Abrams
Attorney, Agent, or Firm—Eugene E. Renz, Jr.

[57] ABSTRACT

A device for covering meter side blades on electric power meters is disclosed. The device includes a sleeve defining an envelope and sealed at one end and open at the other end for enclosing an object. The sleeve includes a pair of generally flat faces spaced apart by a pair of generally rounded edges or sides. The flat faces each have a flap extending form the open end to provide an electrically non-conductive horizontal sheath. The sides each having a skirt extending from the open end to provide an electrically non-conductive vertical side sheath. Arcuate cut outs are provided which separate the flaps from the skirts.

8 Claims, 2 Drawing Sheets

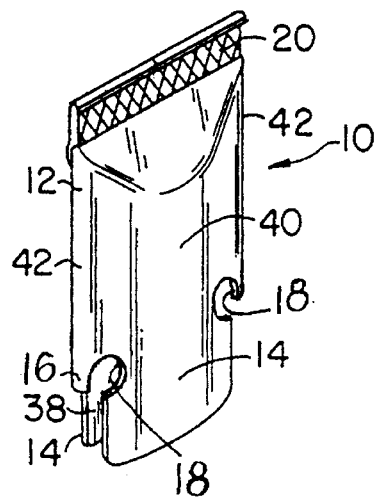
FIG. 1
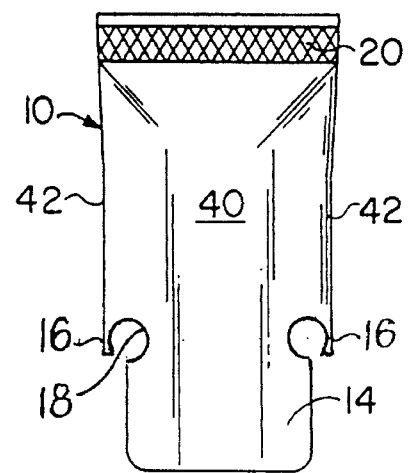
FIG. 2
FIG. 3
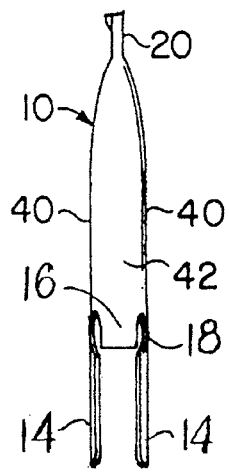
FIG. 4
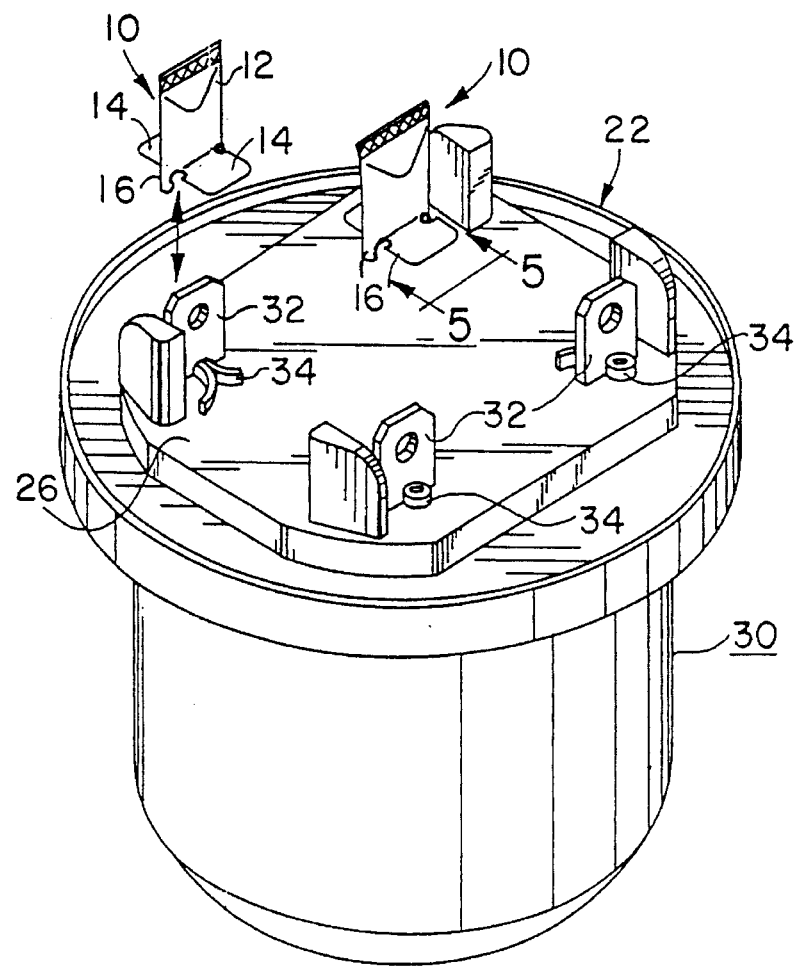

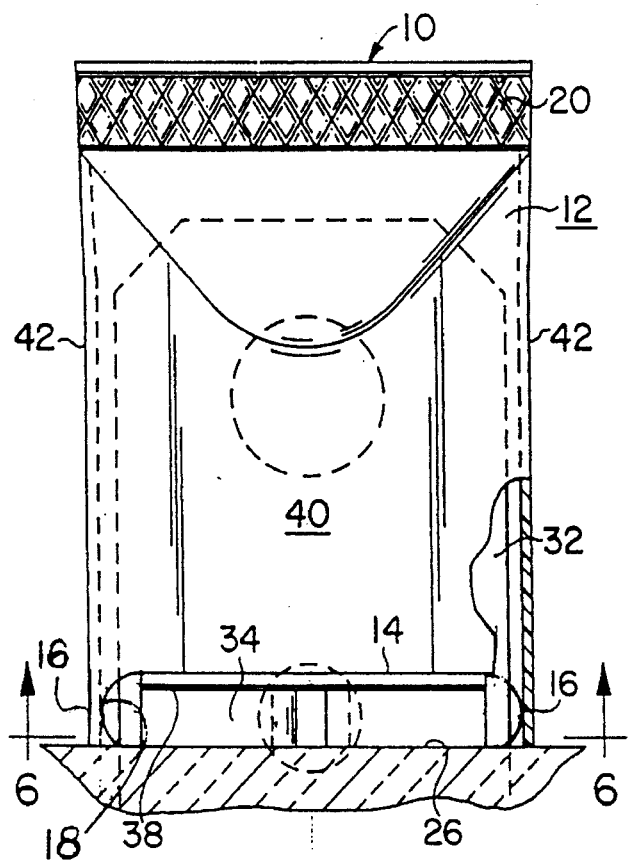
FIG. 5
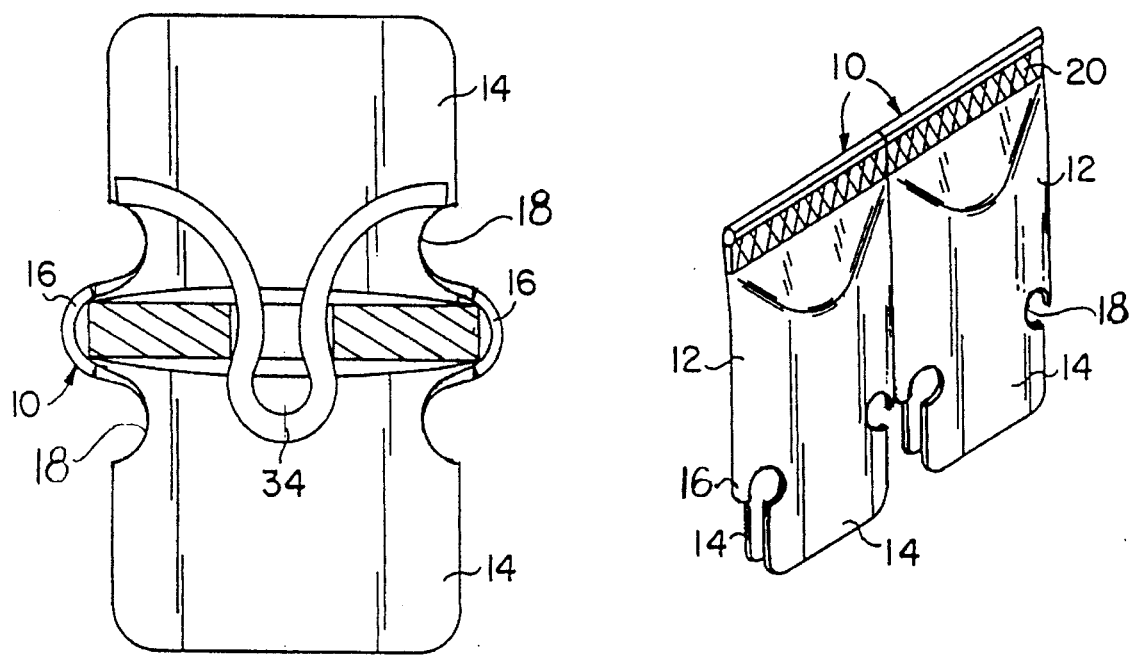
FIG. 6
FIG. 7

DISCONNECT FOR ELECTRIC METERS

FIELD OF THE INVENTION

This invention relates to disconnect sleeves for covering meter side blades on electric power meters in order to disconnect the power load from the meters and the home or business for which the meters are used.

BACKGROUND OF THE INVENTION

Electric power meters are the interface between the electrical load of the residence or business and the power grid power lines and serve to meter, or measure, the electric usage of the power load to enable accurate billing corresponding to the actual electrical usage. It is routine for electric power companies to interrupt electrical power to a residence or business for non-payment of bills or, more commonly, during change of owners or occupancy.

Meters commonly comprise a clear cylindrical observation cover mounted over the metering apparatus which is secured to a base. Two pairs of male meter side blades protrude from the base and reversibly interengage with corresponding female receptors in a receptacle housing which is permanently affixed to a readily accessible portion of the structure which is to receive the power. Power is introduced to the structure's internal electrical system from a power line attached to the receptacle housing via a pair of input female-male side blade connections, through the metering apparatus which measures the power used, and through a second pair of output male-female side blade connections of the meter to the structure's internal electrical wiring system. A lead wire seal, or other such method, is used to ensure the meter is not removed from the receptacle housing or tampered with during normal use.

When the power company desires to interrupt power, a meter person breaks the seal and removes the meter from the receptacle housing. A pair of plastic disconnect sleeves are placed over either the meter's input or output male side blade pair to interrupt electrical flow to the structure. The meter is then remounted on the receptacle housing, and a lead wire seal is affixed to detect any tampering with the meter.

Disconnect sleeves are generally made of insulating plastic which is impervious to electrical flow to ensure that electrical power is interrupted. The sleeves comprise a generally rectangular body portion to fit over the rectangular male side blades, and include two flaps which extend past the open end of the body portion. The other end of the body portion is sealed closed. The sleeve fits over the side blade with the perpendicularly flared flaps overlying a cotter pin which mounts the side blade to the base, and extends over a portion of the meter base. The disconnect sleeves also block moisture from seeping to the male-female connection which would cause a power leakage or arcing.

Disconnect sleeves as currently used are generally made of clear or translucent plastic and do not reduce the potential of undesired electrical leakage or arcing to the female reception in the receptacle housing due to the presence of the cotter pin which spaces the disconnect sleeve from the flat base and exposes a portion of side blade on both edges proximate the meter's base. The exposed base portions of the side blades create the potential for electrical leakage or arcing to the corresponding female receptacles when the meter is mounted on the receptacle housing.

Furthermore, it has been found in sleeves of the type shown in the Harley J. Orr, U.S. Pat. No. 3,519,976, entitled DEVICE FOR INSULATING A JACK, the tendency is to tear along the lateral edges 20 when the flaps are pulled back to place it over the terminal. This tendency is obviated in a sleeve of the present invention by reason of arcuate cut outs extending at least sixty percent (60%) into the sleeve. These arcuate cut outs provides strong resistance to such tearing at this juncture of the sleeve when the panels are turned back to apply it to a terminal.

It is an object of the present invention to provide a disconnect sleeve which virtually eliminates electrical leakage and arcing between the male side blade and the female receptacle.

It is a further object of the present invention to provide a disconnect sleeve which allows visual inspection of its condition and presence.

It is an additional object of the present invention to provide a disconnect sleeve which virtually eliminates unwanted tearing of the lateral sides when positioned on a terminal.

Other objects will appear hereafter.

SUMMARY OF THE INVENTION

It has now been discovered that the objects of the present invention can be accomplished in the following manner. Specifically, a disconnect sleeve has been discovered which virtually eliminates electrical leakage and arcing between the male side blade and the corresponding female receptacle. Additionally, a disconnect sleeve has been discovered that allows rapid and reliable visual inspection of its condition and presence. Also, a disconnect sleeve has been invented which virtually eliminates tearing of the lateral sides when positioned on a terminal by providing arcuate cut outs at the junctures of the side flaps and the flat faces of the sleeve.

The disconnect sleeve of the present invention includes a pair of skirts extending from the generally rounded sides of the sleeve and which cover and shield the side portion of the meter's side blades otherwise exposed due to the presence of the cotter pin through the base of the side blade.

The discount sleeve of the present invention is made of colored or opaque synthetic nylon material. This allows a rapid and reliable visual determination of the presence of the disconnect sleeve to ensure power is not inadvertently interrupted. This also allows a rapid and reliable visual inspection of the physical condition of the disconnect sleeve. Any cracks or tears in the disconnect sleeve are easily detected so that the disconnect sleeve may be replaced.

BRIEF DESCRIPTION OF THE DRAWINGS

These and other objects of the present invention and the various features and details of the operation and construction thereof are hereinafter more fully set forth with reference to the accompanying drawings, where:

FIG. 1 is an enlarged isometric view of a disconnect sleeve made in accordance with the present invention.

FIG. 2 is an enlarged front elevational view of the disconnect sleeve shown in FIG.

FIG. 3 is a side elevational view of FIG. 2.

FIG. 4 is an isometric view showing a typical electric meter having inlet and outlet terminals one, in which one terminals is shown covered by a disconnect sleeve of the present invention, and it's alternate terminal is shown with a disconnect sleeve removed from the terminal blade.

FIG. 5 is a greatly enlarged fragmentary sectional view taken on the line 5,5 of FIG. 4 showing the disconnect sleeve sheathing the terminal blade.

FIG. 6 is a bottom plan sectional view taken on the line 6,6 of FIG. 5.

FIG. 7 is an isometric view showing a pair of disconnect sleeves joined together along the weld closure.

DETAILED DESCRIPTION OF THE PREFERRED EMBODIMENT

Sheathing of meter blades 32 by the disconnect sleeve 10 is done when power is to be disconnected from the power lines to the power load of the structure for which the power meter 22 is connected. Power runs from the external power line to a receptacle base (not shown). Electric power meter 22 includes meter side blades 32 which protrude from the base 26 of the meter 22 and which reversibly engage with female receptacles (not shown) in the receptacle base which allows power to be transmitted to the structure via the input pair of meter side blades 32, the metering apparatus 30, which meters, or measures, the electrical flow for billing purposes, then through the corresponding output pair of meter side blades 32, and into the receiving female receptacles. Sheathing of the meter side blades 32 by the nonconductive plastic disconnect sleeve 10 interrupts the power flow in a simple and efficient manner by a power company service person.

To prevent any leakage or arcing of power from the external power lines to the meter side blades 32 and hence, into the structure for which the electric power meter 22 is attached, either the input or output pair of meter side blades 32 must be completely sheathed. Use of the disconnect sleeves 10 with a power meter 22 is shown in FIG. 4. Preferably the input pair of meter side blades 32 are sheathed. The disconnect sleeves 10 physically separate the meter side blade 32 from the corresponding female receptacle despite cotter pin 34 in the base of the meter side pin 32. Skirts 16 of the disconnect sleeve 10 of the present invention extend to the base 26 of the electric power meter 22 preventing leakage due to the cotter pin 34 spacing the disconnect sleeve 10 from the base 26 of the power meter 22. Additionally, the disconnect sleeve 10 shields the meter side blades 32 from any water or moisture accumulation between the meter side blade 32 and the corresponding female receptacle 36 which could also conduct electricity and cause leakage of electrical power through the electric power meter 22 and hence into the internal electrical load power lines.

The disconnect sleeve of the present invention as shown in FIG. 1 is generally designated 10. Disconnect sleeve 10 includes a pair of generally rectangular side panels connected along parallel spaced side edges 42 to from an envelope and is sealed at one end 20, as described below, and is open at the other end 38. Each face has a flap 14 extending from open end 38 to provide an electrically non-conductive cover over the cotter pin 34 in the meter side blades 32. Each rounded side 42 has a skirt 16 extending from open end 30 to provide an electrically non-conductive cover over the lower side of the meter side blades 32.

Specifically, disconnect sleeve 10 includes a body portion 12, flaps 14, and skirts 16 separated from flap 14 by arcuate cut outs 18. One end of the body portion 12 is ultrasonically flattened and ultrasonically welded as shown at 20. This welded end 20 of the body portion 12 of the disconnect sleeve is sealed to approximately a depth of 0.100 inches. The preferred method of sealing is by ultrasonic welding which provides a watertight and effective seal. It is also possible to seal the end of the disconnect sleeve by heat sealing. Flaps 14 and skirt 16 extend beyond the opposite open end 38 as shown in FIGS. 1, 2 and 3. Flaps 14 extend centrally from the body 12 and skirts 16 are situated outward of flaps 14.

Body portion 12 is preferably 0.835 inches wide by 1.0625 inches long. Flaps 14 are 0.650 inches wide and are centered from the flat faces 40 of the body portion 12 and extend 0.500 inches from the open end 38 of the body portion 12. Skirts 16 are approximately 0.100 inches long and extend from the rounded sides 42 at the open end 38. Arcuate cut outs 18 separate the skirts 16 from the flaps 14. The total length of the sleeve 10 is approximately 1.5625 inches from the closed welded end 20 of the sleeve 10 to the distal end of the flaps 14.

Disconnect sleeves 10 are manufactured from seven inch sections of extruded hardened nonconductive plastic tube, preferably of a nylon type material. The middle of the tube is ultrasonically flattened and welded with a score line separating the halves. The sleeves are then stamped to form the flaps 14 and skirt 16 separated by arcuate cut outs 18. The sleeves 10 are then separated into adjacent pairs connected by flash at their adjacent welded ends 20. See FIG. 7.

Upon use of the disconnect sleeves 10 by electric power company meter persons, each pair of sleeves 10 is separated, see FIG. 7, and the sleeves 10 are placed over adjacent meter side blades as shown in FIG. 4. Flaps 14 are flared out approximately perpendicular from body portion 12 and the sleeves 10 fit over either the input or output pair of meter side blades 32 to interrupt power through the electric power meter 22. Cotter pins 34 extend through the base of the meter side blades 32 adjacent the base 26 of the power meter 22. Flaps 14 flare outwardly and provide an electrically non-conductive cover over the cotter pin 34. Skirts 16 protrude approximately 0.001 inches from the base of body section 12. When the disconnect sleeve 10 is inserted over the meter side blades 32, skirts 16 space the disconnect sleeve 10 above the base 26 of the electric power meter 22 such that the cotter pin 34 is sheathed by the flaps 14 while maintaining electrically non-conductive sheathing on the sides of the meter side blade 32.

Prior art disconnect sleeves do not include skirt 16 and therefore the body portion 12 of the disconnect sleeve 10 is spaced apart from the base 26 of the power meter 22 due to the cotter pin 34 in the meter side blade 32 thus exposing the lower edges of the side blade 32. This allows the potential of undesirable current leakage and arcing between the meter side blades 32 and the corresponding female receptacle 36. Without skirt 16 on the disconnect sleeve 10 the desired power interruption may be frustrated due to direct contact between the lower edge portions of the meter side blades 32 and the corresponding female receptacle 34, and due to any accumulated water or moisture at the lower edge portions of the meter side blade 32 which readily conducts electricity.

The disconnect sleeve 10 of the present invention is made of an opaque or colored plastic material to allow rapid and reliable visual inspection of its presence on a electric power meter 22 to ensure that the disconnect sleeves 10 are not inadvertently left on a meter 22 after power is desired to be reconnected to the structure's power load. The prior art disconnect sleeves are generally made of clear or translucent plastic and have the potential of not being seen by the electrical power personnel during re-connection of power which would add great inconvenience to the business or residential structure and which would necessitate an additional visit by the power company's maintenance personnel to the site. Additionally, the opaque or colored disconnect sleeve 10 of the present invention allows for a rapid and reliable visual inspection of any physical cracks or tears which would also potentially permit power leakage or arcing between the meter side blade 32 and the corresponding female receptacle 36. This allows for replacement of a defective disconnect sleeve 10 with another disconnect sleeve with a minimum of close physical inspection required by the power company personnel.

When flaps 14 are perpendicularly flared out from body portion 12 to position the sleeve 10 over a meter side blade 32, a stress fracture or tear may be induced along the crease line of the fold. Arcuate cut outs 18 are provided to virtually eliminate such stress fractures or tears. Arcuate cut outs 18 as shown in FIG. 2 form at least sixty percent (60%) of a circular cut out in the side panel. It has been found that with a cut out of less than fifty percent (50%), the stretching due to the flaring of flaps 14 results in a stress fracture or tearing along the crease line. When the circular cut out is more than fifty percent (50%) of a circle in the side panels the stretching due to the flaring of flaps 14 is absorbed along the radius of the cut outs and not at the crease line thereby resisting the tendency to create stretch fractures or tears along the crease lines.

While particular embodiments of the present invention have been illustrated and described herein, it is not intended to limit the invention and changes and modifications may be made therein within the scope of the following claims.

What is claimed is:

1. A disconnect sleeve, comprising: a sleeve defining an envelope and sealed at one end and open at the other end for enclosing a vertical electrical terminal extending from a horizontal base, said sleeve having a pair of generally flat faces spaced apart by a pair of generally rounded edges or sides, said flat faces each having a flap extending from said open end to provide an electrically non-conductive horizontal sheath, said sides each having a skirt extending from said open end to provide an electrically non-conductive vertical side sheath, and arcuate cut outs separating said skirts from said flaps.

2. The disconnect sleeve of claim 1, wherein said arcuate cut outs each extend at least fifty percent (50%) into a corresponding circle traced in said flat faces.

3. The disconnect sleeve of claim 2, wherein said arcuate cut outs each extend about sixty percent (60%) into said corresponding circle.

4. The disconnect sleeve of claim 1, wherein said sleeve is sealed by electrasonic kurling.

5. The disconnect sleeve of claim 1, wherein said sleeve is made of extruded hardened non-conductive nylon plastic.

6. The disconnect sleeve of claim 1, wherein said skirts extend about 0.100 inches from said sides.

7. The disconnect sleeve of claim 1, wherein said sleeve is color coded to be distinguishable from the environment of use.

8. The disconnect sleeve of claim 1, wherein said sleeve is made of a material which allows for rapid and reliable visual inspection to determine the presence of said sleeve and the physical integrity of said sleeve.

\* \* \* \* \*